United States Patent [19]

Ishikawa et al.

[11] Patent Number: 4,728,868
[45] Date of Patent: Mar. 1, 1988

[54] HIGH VOLTAGE GENERATING CIRCUIT

[75] Inventors: Katsumi Ishikawa; Nobuhiko Saegusa, both of Tokyo, Japan

[73] Assignee: Pioneer Electronic Corporation, Tokyo, Japan

[21] Appl. No.: 602,643

[22] Filed: Apr. 20, 1984

[30] Foreign Application Priority Data

Apr. 22, 1983 [JP] Japan ............... 58-60483[U]
Apr. 28, 1983 [JP] Japan ................. 58-73731
Apr. 28, 1983 [JP] Japan ................. 58-73732

[51] Int. Cl.$^4$ .................. H01J 29/70; H01J 29/58; H04N 5/63; H04N 5/68
[52] U.S. Cl. .................. 315/411; 315/382; 358/190; 358/243
[58] Field of Search .......... 315/411, 408, 382, 395; 358/190, 243

[56] References Cited

U.S. PATENT DOCUMENTS

| | | | |
|---|---|---|---|
| 3,745,246 | 7/1973 | Kashiwagi | 315/411 |
| 4,144,480 | 3/1979 | Nagasaki et al. | 315/382 |
| 4,316,128 | 2/1982 | Shiratsuchi | 315/382 |
| 4,343,028 | 8/1982 | Hicks | 358/190 |

*Primary Examiner*—Theodore M. Blum
*Assistant Examiner*—Gregory C. Issing
*Attorney, Agent, or Firm*—Sughrue, Mion, Zinn, Macpeak & Seas

[57] ABSTRACT

A circuit for generating a dc high voltage supplied to an anode of a cathode-ray tube, having a simplified circuit structure and reduced size. A first horizontal deflection circuit applies a first flyback pulse across the primary coil of a flyback transformer, while a second horizontal deflection circuit supplies a second flyback pulse to a lower voltage side of the secondary coil of the flyback transformer through a coupling capacitor. A dc voltage supplied to the second horizontal deflection circuit is controlled in response to the output voltage of the secondary coil of the flyback transformer. A current detection circuit for automatic brightness limiting is coupled to the lower voltage side of the secondary coil of the flyback transformer for detecting changes in the secondary current of the flyback transformer.

6 Claims, 7 Drawing Figures

HIGH VOLTAGE GENERATING CIRCUIT

BACKGROUND OF THE INVENTION

The present invention relates to a high voltage generating circuit for generating an anode voltage of a CRT Cathode-Ray Tube) which may be used, for instance, as a picture tube in a television receiver.

In such a high voltage generating circuit, a so-called flyback pulse which appears during horizontal blanking periods is boosted by a flyback transformer to be a high voltage pulse which is then rectified to generate a dc CRT anode voltage. Such a flyback pulse is also termed a horizontal blanking pulse.

The construction of such a prior art high voltage generating circuit is shown in FIG. 1. Horizontal driving pulses 18 derived from a horizontal driving circuit are supplied to a base of a horizontal output transistor 3 in a horizontal deflection circuit 1. Between a collector and an emitter of this transistor 3, a damper diode 4, a resonance capacitor 5 and a deflecting coil 6 are connected in parallel with each other. A capacitor 7, which is connected to the deflecting coil 6 and is intended to compensate a so-called S characteristic, operates as an effective power source for supplying a saw-toothed deflection current to the horizontal deflection coil 6. The transistor 3, the damper diode 4, the capacitors 5 and 7 and the deflecting coil 6 constitute the horizontal deflection circuit 1 in which a source voltage Vcc is supplied to a line extending to the collector of the transistor 3 through a choke coil 8.

Horizontal driving pulses 18 are also supplied to an imitative horizontal deflection circuit 2, which is substantially similar to the horizontal deflection circuit 1. This imitative horizontal deflection circuit 2 includes a dummy coil 12 corresponding to the deflecting coil, in addition to a transistor 9, a diode 10 and capacitors 11 and 13.

The line extending to the collector of the transistor 9 is connected to one terminal of a primary coil 15 of a flyback transformer 14. The secondary coils 16a and 16b of the flyback transformer 14 are connected in series through rectifying diodes 16c and 16d. Hence, the output voltages from the secondary coils are summed and supplied to an anode of a CRT (not shown). A bleeder 23 is connected to the line extending to the anode, and a voltage control circuit 20 is connected to an output terminal of the bleeder 13. This voltage control circuit 20 operates to generate a voltage which varies from the source voltage Vcc by an amount corresponding to a voltage at the output terminal of the bleeder 23, and to supply this voltage to one terminal of a primary coil 15 of the flyback transformer 14.

In addition to the primary and secondary coils 15 and 16, a tertiary coil 17 is wound on the flyback transformer 14. The output voltage from the tertiary coil 17, which is rectified by a diode and smoothed by a smoothing capacitor, is used as a low source voltage in such circuits as the horizontal driving circuit.

In the circuit of FIG. 1 constructed as mentioned above, when the horizontal output transistor 3 turns on in resonse to a horizontal driving pulse fed from the horizontal driving circuit, current will begin to flow from capacitor 7 through the deflecting coil 6, increasing linearly with time. Then, after the transistor 3 turns off, magnetic energy which has been stored in the deflecting coil 6 causes a current to flow which charges the capacitor 4, which in turn causes a voltage at a top terminal of the deflecting coil 6 to rise to a very high value. This boosted voltage appears as the first flyback pulse. When the magnetic energy in the coil 6 has been converted to electrical energy in the capacitor 5, the current flow through the deflecting coil 6 ceases. Thereafter, the electric energy stored in the capacitor is delivered through the deflecting coil 6, causing current to flow through the coil 6 in the opposite direction. After the discharge of the capacitor 5 is completed, the magnetic energy stored in the deflecting coil 6 is delivered through the damper diode 4, causing a so-called damper current to charge the capacitor 7. Then, after the transistor 3 turns on again, the same operation as mentioned above will be repeated, which causes a successive first pulse to be generated. Accordingly, repeating the operation, a saw-toothed current flows through the deflecting coil 6.

The imitative horizontal deflecting circuit 2 operates in the same manner as the horizontal deflecting circuit 1 such that a voltage at a top terminal of a dummy coil 12 is raised to a very high value, causing the generation of the second pulse synchronous with the first pulse. This second pulse is fed to the primary coil 15 of the flyback transformer 14 as a flyback pulse, which causes a boosted voltage to appear across the secondary coils 16a and 16b, which is fed to the anode after being rectified by diodes 16c and 16d.

The peak voltage $V_p$ of this flyback pulse is given by:

$$V_p = V_B\{2\pi(t_H/\sqrt{L_D \cdot C_r} - 1) + 1\}, \tag{1}$$

where $V_B$ is the dc voltage supplied from the voltage control circuit 20, $L_D$ is the reactance of the dummy coil 12, $C_r$ is the capacitance of the capacitor 11, and $t_H$ is the horizontal deflection time (63.5 μS).

The anode current of a CRT varies with changes in load due to a change in brightness of the screen such that the anode current decreases with the brightness of the screen. Hence, the high voltage output supplied to the anode varies with the brightness of the screen. As can be understood from equation (1), since the peak voltage $V_p$ of the flyback pulse varies with the voltage $V_B$, the high voltage output can be stabilized by changing the peak voltage $V_p$ of the flyback pulse through control of the voltage $V_B$.

Hence, in the high voltage generating circuit according to the prior art, the voltage control circuit 20 operates such that it produces a dc voltage $V_B$ which varies from the source voltage Vcc by an amount corresponding to the voltage at the output terminal of the bleeder 23 monitoring the anode voltage. This dc voltage $V_B$ is supplied to the imitative horizontal deflection circuit 2 through the primary coil 15 of the flyback transformer 14.

However, in this conventional high voltage generating circuit, the peak voltage $V_p$ must be varied by changing the dc voltage $V_B$ in order to stabilize the high voltage output, i.e., the anode voltage, and hence the low voltage output induced across the tertiary coil 17 also varies. Therefore, a problem arises in that an additional device such as a voltage regulator is required to stabilize this low voltage output. In addition, another problem arises in that an expensive choke coil is also to be required.

Furthermore, two horizontal output transistors are required in both the horizontal deflection circuit and the imitative horizontal deflection circuit. Hence, a relatively large space is required in this circuit considering that heat radiating fins must usually be provided for these transistors to facilitate heat dispersion from them. Accordingly, the prior art circuit utilizes space poorly and requires many steps in manufacture.

Still further, a current signal, which has a level of only several microamps to several milliamps, used for automatic brightness limiting (ABL) cannot be picked up from the secondary side of the flyback transformer.

SUMMARY OF THE INVENTION

Accordingly, it is an object of the present invention to provide a high voltage generating circuit which has a lower cost and has no adverse influence upon a low voltage output.

Another object of the present invention is to provide a compact high voltage generating circuit in which one horizontal output transistor can be eliminated from an imitative horizontal deflection circuit.

Still another object of the present invention is to provide a high voltage generating circuit which can readily provide a current signal for ABL.

The objects mentioned above are achieved by a high voltage generating circuit of the present invention which comprises a flyback transformer which receives a flyback pulse across the primary coil thereof and means which generates a compensation pulse at the same time a flyback pulse appears. The compensation pulse is varied in response to the brightness level of the video signal. The output voltage from the secondary coil and a voltage of the compensation pulse are summed, and the sum signal is rectified to form a CRT anode voltage which remains nearly constant with changes in brightness.

Objects of the invention are also achieved by a high voltage generating circuit comprising a flyback transformer, means for applying the first flyback pulse across a primary coil of the flyback transformer, means for supplying the second flyback pulse for stabilizing the anode voltage to a lower voltage side of a secondary coil of the flyback transformer, a potentiometer having one terminal coupled to a center tap of the secondary coil of the transformer and the other terminal provided with the second flyback pulse, and a smoothing capacitor coupled to the potentiometer in parallel therewith. The output voltage from the potentiometer is provided as a focus controlling voltage.

BRIEF DESCRIPTION OF THE DRAWINGS

Still other objects and features of the present invention will be apparent from the following description of the accompanying drawings wherein.

DESCRIPTION OF THE PREFERRED EMBODIMENTS

Figure 1:
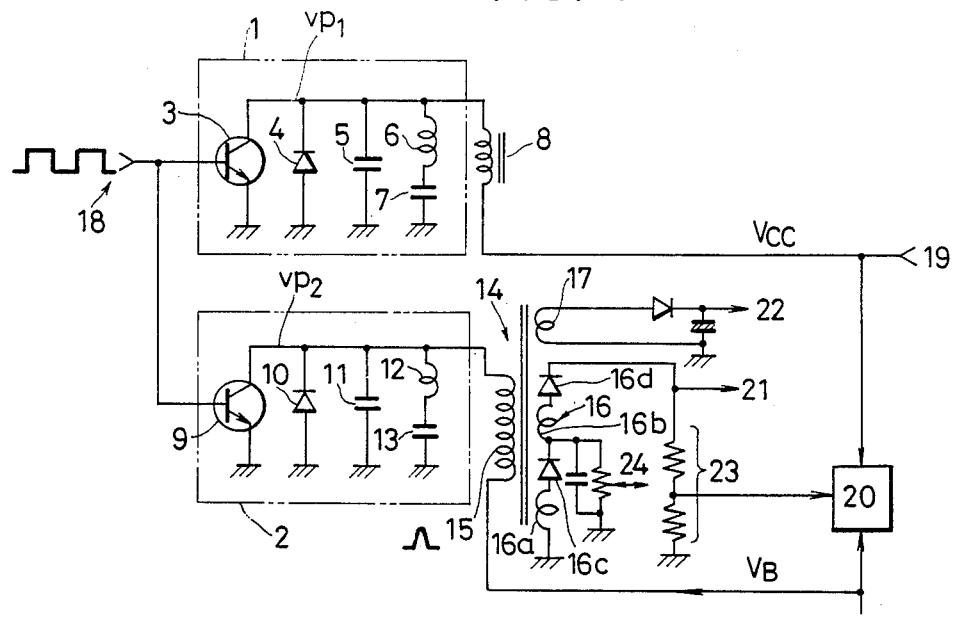
FIG. 1 is a circuit diagram of a prior art high voltage generating circuit.
Figure 2:
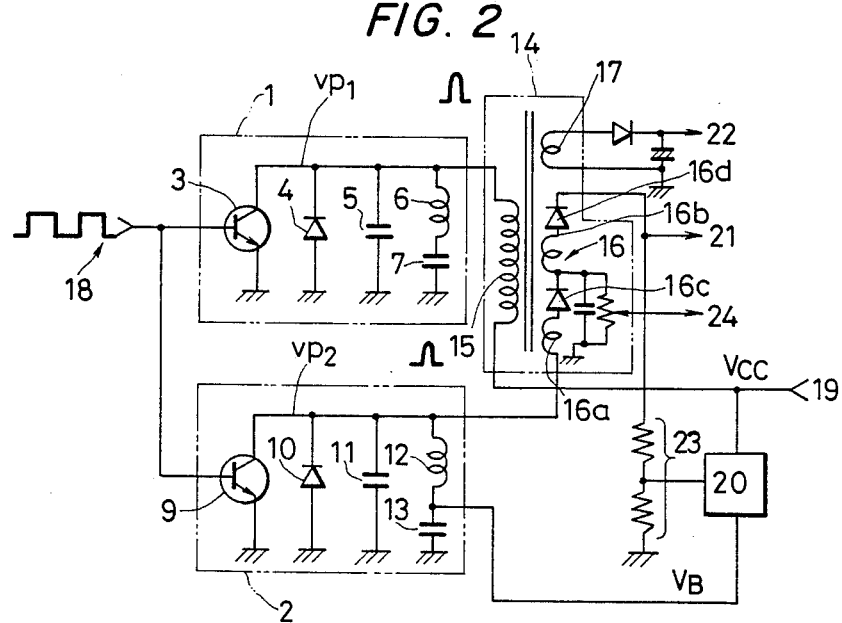
FIG. 2 is a circuit diagram of an embodiment of the present invention.

FIG. 2 shows a high voltage generating circuit according to a first preferred embodiment of the present invention in which the same reference numerals are used for the same elements as in FIG. 1.

In this circuit, the source voltage Vcc is supplied to a line extending to a collector of a horizontal output transistor 3 through the primary coil 15 of a flyback transformer 14, while the secondary coil 16 of the flyback transformer 4 is serially connected with a dummy coil 12 to add an induced high voltage across the secondary coil 16 of the flyback transformer 14 to the second pulse voltage appearing across dummy coil 12. An output from a voltage control circuit 20 is coupled to the point where the dummy coil 12 and the capacitor 13 are connected together. The remainder of the construction and operation of the circuit in FIG. 2 is substantially the same as the prior art circuit in FIG. 1, and therefore a duplicated description will not be required.

In the circuit of FIG. 2, the first pulse appearing across the deflecting coil 6 after the transistor 3 turns off is supplied to the primary coil 15 of the flyback transformer 14 as a flyback pulse. This flyback pulse induces a high voltage and a low voltage respectively across the secondary coil 16 and tertiary coil 17. The transistor 9, which turns off at the same time as the transistor 3, generates a second pulse across the dummy coil 12 which is used to compensate the anode voltage. The high voltage developed across the secondary coil 16a is added to the voltage developed across the dummy coil 12. The summed voltage is then rectified by a diode 16c and the high voltage across the secondary coil 16b is further added and the resultant rectified by a diode 16d. The rectified high voltages is supplied to the anode of the CRT.

Since the voltage across the capacitor 13 varies depending on the voltage $V_B$ supplied from the voltage control circuit 20, it varies with changes in the anode voltage. Therefore, the amount of magnetic energy stored in the dummy coil 12 varies with the voltage $V_B$ because the magnitude of the current which flows from the capacitor 13 into the dummy coil 12 after the transistor 9 turns on varies with the voltage across the capacitor 13. Hence, the raised voltage across the dummy coil 12 after the transistor 9 turns off, i.e., the peak value of the voltage used for compensation, varies with the anode voltage.

If the anode current increases due to an increase in the brightness of a screen, the anode voltage decreases. The decrease of the anode voltage is detected by the voltage control circuit 20 through the change of the output voltage of the bleeder 23. The voltage $V_B$ is accordingly increased such that the increment in the peak value of the compensating pulse nearly equals the decrement in the anode voltage. Hence, the final anode voltage remains constant. On the other hand, if the anode voltage increases due to a decrease in the brightness of the screen, a decrement in the peak value of the compensating pulse nearly equal to the increment in the anode voltage causes the final anode voltage to remain nearly constant.

It should be noted that the source voltage which is supplied to the horizontal deflection circuit 1 always remains constant, and hence the peak voltage of the flyback pulse $V_{P1}$, and therefore the low output voltage derived from the tertiary coil 17, always remain constant.

As explained above, the high voltage generating circuit according to the present invention operates to add the pulse voltage to the high voltage of the secondary coil to compensate variations of the anode voltage, instead of varying the peak voltage of the flyback pulse applied to the primary coil of the flyback transformer. Therefore, the anode voltage can be stabilized without adversely affecting the tertiary coil would on the flyback transformer. In addition, the high voltage generating circuit of the present invention is less expensive than the circuit of the prior art since it requires no choke coil.

In the high voltage generating circuit of FIG. 2, the voltage used for focus control (the focus voltage) is provided to a line 24 from a voltage divider which is coupled to the tap of the secondary coil 16 of the flyback transformer 14. This focus voltage tends to be over-compensated because one terminal of the voltage divider is coupled to ground potential. Hence, a problem arises that the focus is degraded with an increase in brightness.

Figure 3:
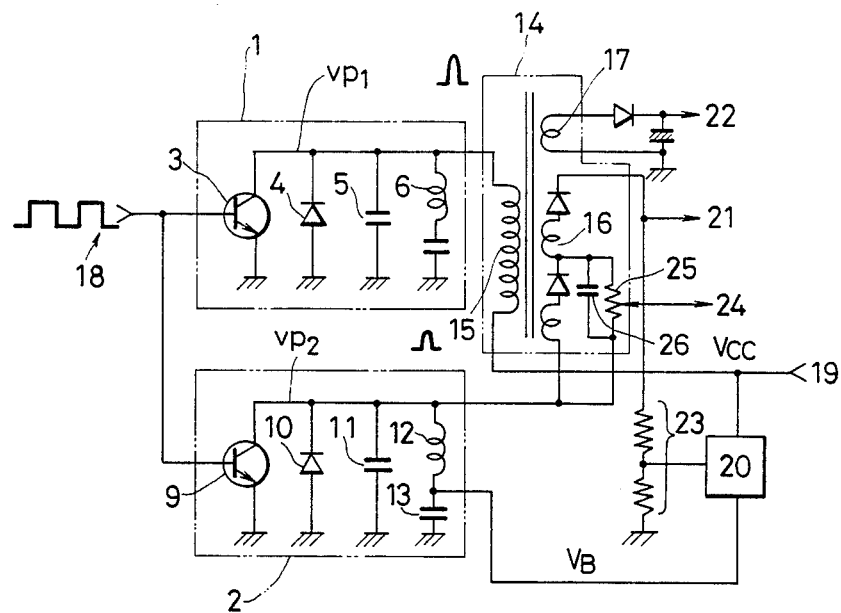
FIG. 3 is a circuit diagram of another embodiment of the present invention.

In the high voltage generating circuit shown in FIG. 3, this problem is eliminated by applying a pulse voltage generated in the imitative horizontal deflection circuit 2 to one terminal of the voltage divider providing the focus voltage.

In the high voltage generating circuit of FIG. 3, the same reference numerals are used for the same elements as in FIG. 2.

In the high voltage generating circuit of FIG. 3, the first terminal of a potentiometer 25 is provided with a rectified voltage at the tap of the secondary coil 16 of the flyback transformer 14, while the second terminal of the potentiometer 25 is provided with the horizontal deflecting pulse from the imitative horizontal deflection circuit 2. A smoothing capacitor 26 is further connected between the terminals of the potentiometer 25.

A flyback pulse $V_{P1}$ generated by the horizontal deflection circuit 1 is boosted and then rectified by the flyback transformer 14, appearing as the output voltage 21 supplied to the anode of CRT. If the output voltage 21 decreases, this decrement will be detected by a bleeder 23. The detected signal is supplied to a voltage control circuit 20 which controls a voltage $V_B$ so that the voltage of the flyback pulse $V_{P2}$ is increased. This increased flyback pulse is supplied to a lower side of the secondary coil 16 of the flyback transformer 14 so that the output voltage 21 remains constant.

It should be noted that the voltage across the smoothing capacitor 26 does not vary with the flyback pulse $V_{P2}$ because a boosted flyback pulse $V_{P2}$ is also supplied to the second terminal of the potentiometer 25. Hence, the focus voltage 24 remains constant while the magnitude of the flyback pulse $V_{P2}$ is changed, resulting in an improvement in the tracking error of focusing due to the stabilized high voltage.

Figure 4:
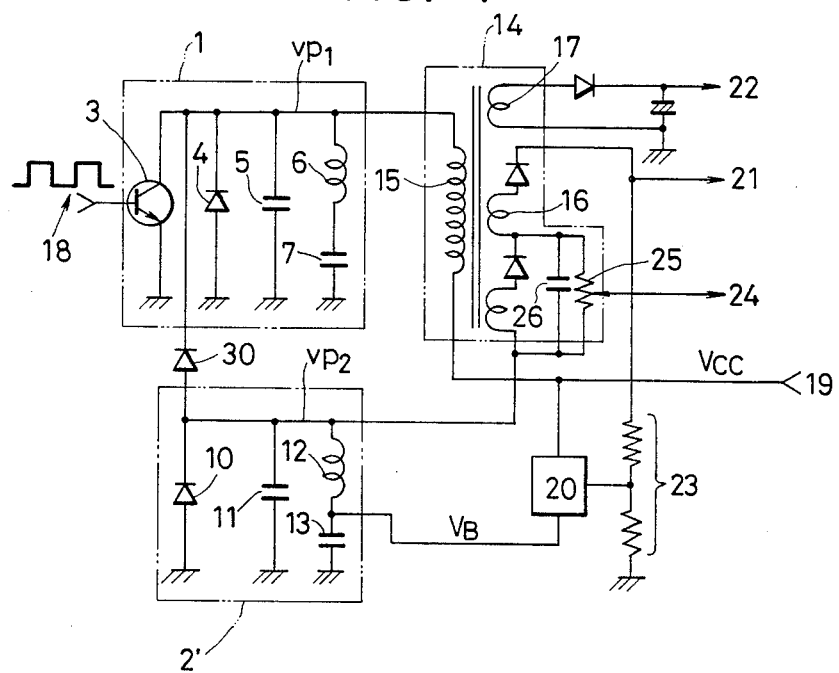
FIG. 4 is a circuit diagram of still another embodiment of the present invention.

FIG. 4 is a block diagram of a high voltage generating circuit according to another embodiment of the present invention, which is an alternative to the high voltage generating circuit shown in FIG. 3. In the circuit of FIG. 4, the same reference numerals are used for the same elements in FIG. 3.

In the high voltage generating circuit of FIG. 4, the transistor 9 in FIG. 3 is removed and a diode 30 is added. This diode 30, which has an anode receiving a flyback pulse voltage $V_{P2}$ generated by the imitative horizontal deflection circuit 2' and a cathode coupled to the collector of the transistor 3 in the horizontal deflection circuit 1, is switched on and off by the output voltage of the collector of the transistor 3.

Figure 5:
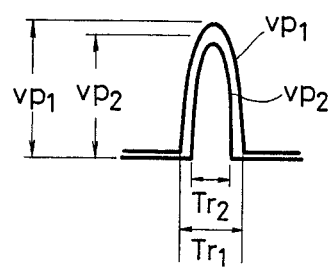
FIG. 5 is a waveform chart used to explain the operation of the circuit of FIG. 4.

As shown in FIG. 5, the width $Tr_1$ and the magnitude $V_{P1}$ of the flyback pulse derived from the horizontal deflection circuit 1 and the width $Tr_2$ and the magnitude $V_{P2}$ of the flyback pulse derived from the imitative horizontal deflection circuit 2' are adjusted so as to satisfy the conditions $V_{P1} > V_{P2}$ and $Tr_1 > Tr_2$. These conditions are easily satisfied by selecting circuit parameters of the horizontal deflecting coil 6, resonance capacitor 5, dummy coil 12 and resonance capacitor 11 to provide widths $Tr_1$ and $Tr_2$ of the flyback pulses of, respectively, $\pi\sqrt{L_Y \cdot C_{r1}}$ and $\pi\sqrt{L_D \cdot C_{r2}}$, where $L_Y$ is the inductance of the horizontal deflecting coil 6, $C_{r1}$ is capacitance of the resonance capacitor 5, $L_D$ is the inductance of the dummy coil 12, and $C_{r2}$ is the capacitance of the resonance capacitor 11.

The first terminal of a potentiometer 25 receives a rectified voltage at the tap of the secondary coil 16 of the flyback transformer 14, while the second terminal of the potentiometer 25 is coupled to the flyback of the imitative horizontal deflection circuit 2'. A smoothing capacitor 26 is further connected between the terminals of the potentiometer 25.

In the high voltage generating circuit of FIG. 4, the horizontal deflection circuit 1 generates a flyback pulse $V_{P1}$ in response to a supplied horizontal driving pulse 18, and the flyback pulse thus generated is boosted by the flyback transformer 14. The boosted flyback pulse $V_{P1}$ is rectified and supplied to the CRT as its anode voltage.

The diode 30 is switched on and off by the output of the transistor 3, which causes the flyback pulse voltage $V_{P2}$ to appear in the imitative horizontal deflection circuit from the secondary coil 16 is manitored by the voltage 2'. At the same time, the output voltage from the secondary coil 16 is monitored by the voltage control circuit 20, which controls the dc voltage $V_B$ supplied to the imitative horizontal deflection circuit 2'.

If the output voltage from the secondary coil 16 increases, then the voltage control circuit 20 decreases the dc supply voltage $V_B$. This decrease in the dc supply voltage $V_B$ causes a decrease in the flyback pulse voltage $V_{P2}$ generated in the imitative horizontal deflection circuit 2'. Hence, the output voltage from the secondary coil 16 remains nearly constant. On the other hand, if the output voltage from the secondary coil 16 decreases, the dc supply voltage $V_B$ increases. This increase in the voltage $V_B$ causes an increase in the output flyback pulse voltage $V_{P2}$ from the imitative horizontal deflection circuit 2', and hence the output voltage from the secondary coil 16 remains nearly constant.

In addition, as is the case with the high voltage generating circuit of the FIG. 3, the flyback pulse generated in the imitative horizontal reflecting circuit 2' is applied to the second terminal of the potentiometer 25. Therefore, the variations in the voltage of the flyback pulse appear on both terminals of the smoothing capacitor 26 simultaneously, which causes no variation in the focus voltage output 24 even if the amplitude of the flyback pulse $V_{P2}$ varies. Hence, the focus tracking error while the high voltage is stabilized.

Since the magnitude $V_{P1}$ and the width $Tr_1$ of the flyback pulse appearing in the horizontal deflection circuit 1 are adjusted such that they are respectively larger than that of flyback pulses $V_{P2}$ and $Vr_2$ in the imitative horizontal deflection circuit 2', the diode 30 always is reverse biased. Therefore, the flyback pulses of the circuits 1 and 2' do not interact.

Although in FIG. 4 only one embodiment is shown in which the dc voltage across the capacitor 13 in the imitative horizontal deflection circuit 2' is directly controlled by the voltage control circuit 20, other equivalent arrangements can be used. For example, a controllable inductor such as saturatable reactor may be coupled to the resonance capacitor 11 or dummy coil 12 in series so as to control the peak voltage of the flyback pulse. Also the diode 30 may be implemented with a plurality of diodes, and the transistor 3 may be a switching element other than a bipolar transistor.

In the high voltage generating circuit of FIG. 4, since the diode 30 is used instead of the horizontal deflection circuit 2', the overall volume of the circuit is reduced, and the space factor is improved.

Figure 6:
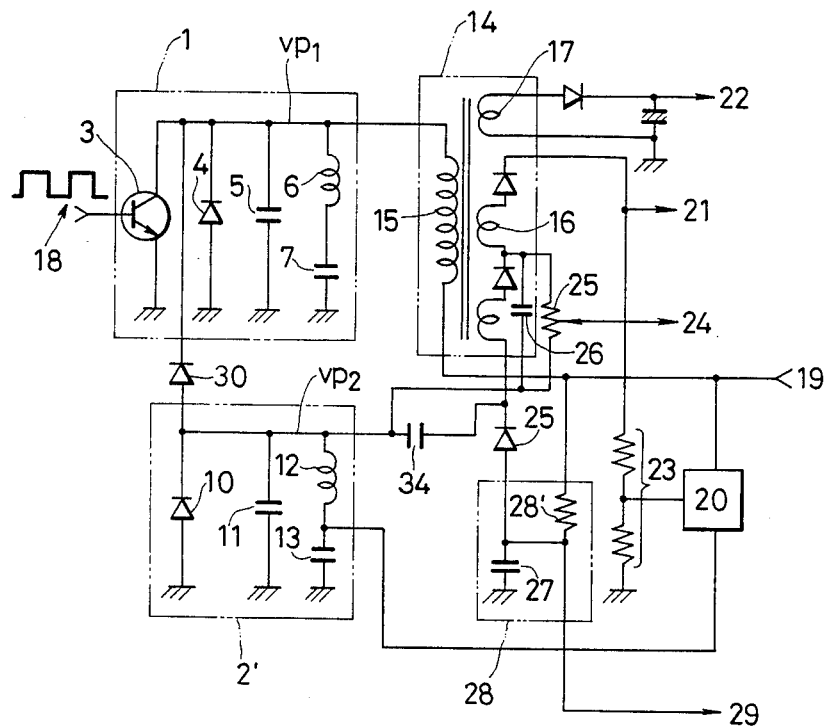
FIG. 6 is a circuit diagram of another embodiment of the present invention.

A high voltage generating circuit according to still another embodiment of the present invention is shown in FIG. 6.

The high voltage generating circuit of FIG. 6 differs from the circuit of FIG. 4 in that it furthe includes a coupling capacitor 34 which couples the output flyback pulse derived from the imitative horizontal reflection circuit 2' to the lower voltage side of the secondary coil 16 of the flyback transformer 14, and further includes a current detection circuit 28 for the use of an automatic brightness limiter (hereinafter, ABL), including an integrating capacitor 27 coupled to the lower voltage side of the secondary coil 16 and a resistor 28' coupled between the integrating capacitor 27 and the dc voltage source 29. The second terminal of the potentiometer 25 is connected to the output terminal of the imitative horizontal deflection circuit 2', i.e., the point where the terminals of the resonance capacitor 11 and dummy coil 12 are connected together.

In the high voltage generating circuit of FIG. 6, an alternating voltage of the output flyback pulse generated in the imitative horizontal deflection circuit 2' is coupled to the lower voltage side of the secondary coil 16 of the flyback transformer 14 through the coupling capacitor 34. Therefore, the operation in generating and stabilizing the high voltage output is essentially the same as in the circuit of FIG. 4. However, since the output flyback pulse from the imitative horizontal circuit 2' is coupled to the secondary coil through the coupling capacitor 34, the high voltage output can be stabilized without affecting the other coils of the flyback transformer 14.

In addition, since the focus voltage on the line 24 remains constant, independent of changes in the flyback pulse $V_{P2}$, the focus tracking error is decreased, as is the case of the circuit of FIG. 4.

A change in the anode current of the CRT causes a change in the primary current of the flyback transformer 14, which in turn causes a change in the voltage drop across the resistor 28'. If the anode current increases, then the voltage drop across the resistor 28' increases, which causes a decrease in the voltage at the terminal of the resistor 28', i.e., the output terminal 29 of the current detecting circuit for the ABL 28. In this manner, increases in the anode current are detected. On the other hand, if the anode current decreases, then the voltage drop across the resistor 28' decreases, causing an increase of the voltage at the output terminal 29 of the current detecting circuit for the ABL 28, and thus decreases in the anode current are detected.

The output from the current detecting circuit for the ABL 28 may be supplied to a control circuit of a contrast adjusting circuit in a video signal circuit or a brightness adjusting circuit, and may be used to limit increases in the anode current and the brightness of the CRT when the anode current increases unextraordinarily.

The high voltage generating circuit described above facilitates the current detection operation for the ABL. In the case in which the integrating capacitor 27 is removed, peak ABL can be achieved instead of mean value ABL mentioned above.

Figure 7:
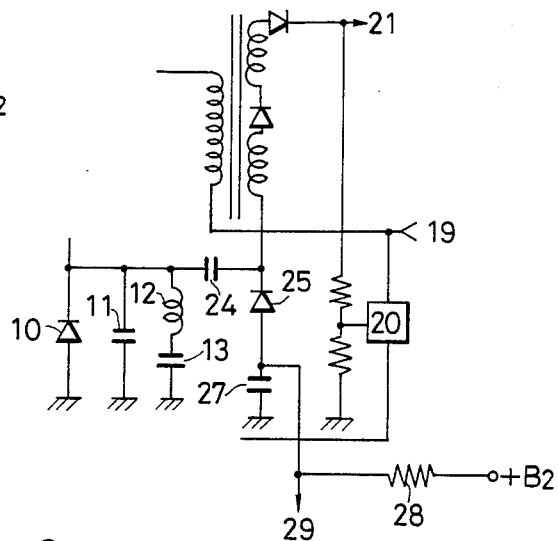
FIG. 7 is a partial circuit diagram showing further modifications to the embodiment shown in FIG. 6.

An embodiment has been described in which the resistor 28' for detecting the ABL current is coupled to the dc source voltage 19. However, as shown in FIG. 7, a separate voltage supply which provides a dc source voltage to the capacitor 27 through the resistor 28 may be used. Although an embodiment has been shown in which the horizontal driving pulse 18 supplied to the horizontal deflection circuit 1 is also supplied to the imitative horizontal deflection circuit 2, a pulse train synchronized with the horizontal driving pulse 18 may be supplied to the imitative deflection circuit 2. Furthermore, the voltage control circuit 20 may detect the anode voltage by detecting the ABL current instead of the voltage from the bleeder 20 in order to control the dc voltage supplied to the imitative horizontal deflection circuit. In addition, a controllable inductor such as a saturatable reactor may be coupled to the resonance capacitor 11 or the dummy coil 12 serially in order to control the peak voltage of the flyback pulse $V_{p2}$, or the duty ratio of the horizontal driving pulse 18 supplied to the horizontal deflection circuit 2 may be controlled instead of controlling the dc voltage $V_B$ supplied to the horizontal deflection circuit 2.

It should be understood that the invention is not limited in its application to the details of construction and arrangement of parts illustrated in the accompanying drawings, since the invention is capable of other embodiments and of being practiced or carried out in various ways without departing from the spirit of the invention or the scope of the appended claims.

We claim:

1. A high voltage generating circuit for generating a DC high voltage to be supplied to an anode of a CRT, comprising:
   a flyback transformer receiving across a primary coil thereof a flyback pulse from a horizontal deflecting circuit during each horizontal blanking period;
   means for generating a compensating pulse at the same time said flyback pulse appears, said compensating pulse having a peak voltage variable in response to a detected level of brightness of a video signal; and
   means for summing an output voltage from the secondary coil of the flyback transformer and said compensating pulse and rectifying the sum to form said DC high voltage, which remains nearly constant with a change in said brightness, said secondary coil including a first secondary coil portion having a first end and a second end and a second secondary coil portion series-connected with said first second coil portion with a first end of said second secondary coil portion coupled to said second end of said first secondary coil portion at a junction therebetween, with means coupled to said junction independently of said first secondary coil portion for generating a focus control voltage, wherein said means for summing comprises means for applying said compensating pulse to said first end of said first secondary coil portion and means for rectifying coupled to a second end of said second secondary coil portion to form said DC high voltage.

2. A high voltage generating circuit for generating a dc high voltage to be supplied to an anode of a CRT, comprising:
   a flyback transformer having a primary coil and a secondary coil for providing said dc high voltage;
   a first horizontal deflection circuit for applying a first flyback pulse across said primary coil of said flyback transformer;
   a second horizontal deflection circuit for supplying a second flyback pulse for stabilizing said dc high voltage to lower voltage side of said secondary coil of said flyback transformer;
   a potentiometer having a first terminal coupled to a center tap of said secondary coil of said flyback transformer and a second terminal provided with said second flyback pulse form said second horizontal deflection circuit; and
   a smoothing capacitor coupled in parallel with said potentiometer, an output voltage from said potentiometer being provided as a focus controlling voltage.

3. A high voltage generating circuit as claimed in claim 2, wherein said secondary coil of said flyback transformer includes a first terminal for receiving said second flyback pulse, a second terminal for providing said DC high voltage, with said center tap located between said first and second terminals of said secondary coil.

4. A high voltage generating circuit as claimed in claim 2, further comprising detection means for detecting a level of brightness of a video signal and wherein said second horizontal deflection circuit includes means for varying said second flyback pulse in accordance with said detected brightness level.

5. A high voltage generating circuit for generating a dc high voltage to be supplied to an anode of a CRT, comprising:
   a flyback transformer having a primary coil and a secondary coil for providing said dc high voltage;
   a first horizontal deflection circuit for applying a first flyback pulse across said primary coil of said flyback transformer;
   a second horizontal deflection circuit for supplying a second flyback pulse for stabilizing said dc high voltage to a lower voltage side of said secondary coil of said flyback transformer; and
   a diode having a cathode coupled to a terminal at which said first flyback pulse appears in said first horizontal deflection circuit and having an anode coupled to a terminal at which said second flyback pulse appears in said second horizontal deflection circuit, whereby switching operations of said first and second horizontal deflection circuits are performed by a single horizontal output switching element.

6. A high voltage generating circuit for generating a dc high voltage to be supplied to an anode of a CRT, comprising:
   a flyback transformer having a primary coil and a secondary coil for providing said dc high voltage;
   a first horizontal deflection circuit for applying a first flyback pulse across said primary coil of said flyback transformer;
   a second horizontal deflection circuit for supplying a second flyback pulse to a lower voltage side of said secondary coil of said flyback transformer through a coupling capacitor;
   means for controlling a dc source voltage supplied to said second horizontal deflection circuit in response to an output voltage from said secondary coil of said flyback transformer; and
   a current detecting circuit for automatic brightness limiting coupled to a lower voltage side of said secondary coil of said flyback transformer for detecting changes in a secondary current of said flyback transformer.

* * * * *